US007574668B2

(12) United States Patent
Nunez et al.

(10) Patent No.: US 7,574,668 B2
(45) Date of Patent: Aug. 11, 2009

(54) NAVIGATION PROCESS DISPLAYING A MOBILE WINDOW, VIEWING APPARATUS IMPLEMENTING THE PROCESS (75) Inventors: Loic Nunez, Montfavet (FR); Nadine Patry, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 482 days.

(21) Appl. No.: 10/973,907

(22) Filed: Oct. 26, 2004

(65) Prior Publication Data
US 2005/0193348 A1 Sep. 1, 2005

(30) Foreign Application Priority Data
Oct. 30, 2003 (FR) ................... 03 50749

(51) Int. Cl.
*G06F 3/00* (2006.01)
(52) U.S. Cl. .................. 715/772; 715/818; 715/854; 715/769; 715/720; 348/569
(58) Field of Classification Search ............... 715/772, 715/716, 720, 854, 769, 818, 850, 858, 855, 715/856, 857; 348/E5.104, 105, 569
See application file for complete search history.

(56) References Cited
U.S. PATENT DOCUMENTS

| 5,978,043 A * | 11/1999 | Blonstein et al. ........... 348/569 |
| 6,038,588 A * | 3/2000 | Nagarajayya et al. ....... 718/102 |
| 6,133,909 A * | 10/2000 | Schein et al. ............... 715/721 |
| 6,353,444 B1 * | 3/2002 | Katta et al. ................. 715/716 |
| 6,452,609 B1 | 9/2002 | Katinsky et al. |
| 6,927,770 B2 * | 8/2005 | Ording ........................ 345/440 |
| 7,065,521 B2 * | 6/2006 | Li et al. ........................ 707/3 |
| 2002/0059593 A1 | 5/2002 | Shao |

OTHER PUBLICATIONS

Alan Simpson, Windows95 Uncut, copyright 1995, IDG Books Worldwide,Inc., pp. 101 and 335.*
Allan Simpson, Windows Uncut, copyright 1995, IDG Books Worlwide, Inc., pp. 101 and 335.*
Copy of Search Report Oct. 26, 2004.

* cited by examiner

*Primary Examiner*—Stephen S Hong
*Assistant Examiner*—Phenuel S Salomon
(74) *Attorney, Agent, or Firm*—Robert D. Shedd; Harvey D. Fried; Joel M. Fogelson (57) ABSTRACT This invention discloses a process for navigation within a set of audiovisual documents with the help of a displayed menu system. A graphical page is displayed, it contains at least two, possibly unitary, lists, L1 and L2 of elements associated with audiovisual documents, each element being disposed in a graphical window. Subsequent to a navigation command entered by the user, the graphical window containing a so-called "current" element of the starting list L1 becomes mobile and moves to at least one arrival list L2 in the direction specified by the command, the duration of the movement being at least equal to the duration of the execution of the command. The invention also relates to a device able to execute a software navigation module. Following the entry of a command, the said module moves a graphical window in a certain direction and for a determined calculation time.

12 Claims, 5 Drawing Sheets

NAVIGATION PROCESS DISPLAYING A MOBILE WINDOW, VIEWING APPARATUS IMPLEMENTING THE PROCESS

This application claims the benefit, under 35 U.S.C. § 119 of French Patent Application 03/50749, filed Oct. 30, 2003.

FIELD OF THE INVENTION

The invention relates to a process for navigating amongst multimedia documents accessible with the help of a viewing apparatus and a viewing apparatus equipped with a user interface for implementing the process.

BACKGROUND

A user interface generally uses descriptive data to formulate menus which can be displayed on a television screen, these data enabling the user to choose the audiovisual document in which he is interested. The MPEG-7 standard specifies descriptive data associated with audiovisual contents. The MPEG-7 standard is distributed by the ISO under the reference ISO-IEC JTC1/SC29/WG11-N5525 published in March 2003. If these documents are received from a transmission network, the descriptive data are stored in a local database and constantly updated as a function of the documents accessible on the network. Other descriptive data exist, likewise other media such as PVRs (standing for "Personal Video Recorder"). The audiovisual documents may also be downloaded when requested by the user from a bi-directional network. In this case, the user receives a catalogue, chooses there from the document in which he is interested and activates his download to the memory of his apparatus. The descriptive data in the documents are recorded in a database and grouped together according to certain criteria such as topic, language, rating, etc. During a navigation, these criteria constitute nodes of a graph, the user selecting an element. By progressing forwards in the navigation within the graph, the user aggregates the criteria, thereby allowing refined selection of the documents. The aim being to offer the user a restricted choice of documents and therefore a faster choice.

Patent Application FR2809268 filed by the Applicant and published on 23 Nov. 2001 describes a process for navigating within a menu for the selection of television programs and a device integrating a graphical interface allowing navigation through these menus. The menus displayed make it possible to utilize a navigation graph, the menus displaying lists of elements associated with nodes of the graph. With the help of this interface, the user determines his criteria for navigating within the graph so that the interface effects a filtering of the documents which is perfectly matched to the preferences of the user. The graph defines a navigation structure accessible through the user's commands. The user navigation interface displays on the screen the list of elements that are associated with each node of the graph or a selected list of documents having the user's preferences. This way of navigating is called "hypernavigation", it is akin to internet navigation where the HTML pages are interconnected by "hyperlinks".

Nowadays, the means by which a person can obtain at home audiovisual documents chosen from a continually growing catalogue are ever more powerful. The size of the screen being limited, it is preferable to offer the user a very detailed selection of documents so as to display the result of the filtering on a page. Therefore, searching for documents with current user interfaces proves to be lengthy and tedious, and the programs making it possible to select elements as a function of criteria take an ever greater time. The introduction of digital networks has seen the appearance of mass storage means, digital TV decoders also permitting access to internet type networks in homes. Tomorrow's user will be faced with a very considerable quantity of multimedia documents of various types, such as audio, videos, pictures, text, application/services, etc. Formatting into a menu can be done only when the result of the filtering is complete, hence the response time of the apparatus becomes ever longer. During this time, the user may wonder whether his apparatus is operating or not. To decrease the waiting times, it is possible to increase the processing capabilities of the central unit and the memory size, but it is expensive to do this.

U.S. Pat. No. 5,978,043—Blonstein published on 21 Nov. 1999 describes a process for navigating within a menu displayed on a screen. This menu presents a list of names of transmission channels that the user can select. A cursor moves over the various elements as a function of the commands issued by the user. The movement of this cursor gives no precise indication as to the execution of the command performed.

U.S. Pat. No. 6,452,609—BURRES published on 17 Sep. 2002 also describes a menu displaying icons selectable with the help of an arrow-shaped cursor. The user moves the cursor, so the motion of the cursor provides no additional information for the user.

The invention presents another alternative by proposing a new concept of user interface offering the user feedback as to the task that he is currently executing.

SUMMARY OF THE INVENTION

A subject of the invention is a process for navigating among a list of elements displayed by a viewing apparatus equipped with a display means, comprising a step of generating a graphical page on a display means, the graphical page comprising at least two possibly unitary lists of elements associated with documents wherein the entry of a command from the user specifying a direction triggers a step of movement of at least one mobile graphical window of a current element from a first list to a second list in the direction specified and in that the duration of the movement is at least equal to the duration of the execution of the command.

In this way the user sees that the processing performed by his apparatus does indeed correspond to the navigation command that he has just entered. The movement of the window of the current element (the element is also said to be in focus) indicates to him that the new current element which will be displayed at the end of the movement will be in the list indicated by the direction of the movement. The duration of movement of the mobile graphical window containing the current element is at least equal to the duration of processing to determine the new elements of the second list. In this way, knowing the point of arrival of the graphical window and seeing the speed of its movement, the user can estimate the time for execution of the command and thus avoid becoming impatient.

A first improvement consists in that, at the end of the movement of the mobile graphical window, new elements are displayed in the arrival list.

Another improvement consists in that the duration of movement is calculated on the basis of the number of new elements displayed in at least one of the lists. A variant consists in that the duration of movement depends on the type of command triggering the calculation of the new elements displayed in at least one of the lists.

Another improvement consists in that a copy of the mobile graphical window remains in the first list. This informs the user that, on completion of the movement, the content of the starting list is not modified. Another alternative consists in that the graphical window of the current element exits the first list leaving a void in the latter. In this way, the user is informed that the content of the starting list will be modified at the end of the movement.

Another improvement consists in that the graphical window containing the current element is divided into a plurality of windows which move towards as many arrival lists. The arrival lists are updated with new elements when the corresponding mobile window reaches them.

An improvement consists in that the starting list contains attribute values associated with nodes of a navigation graph, the current value of attribute being graphically highlighted. The arrival lists display, before or after the movement, elements in relation to the current attribute value. A last improvement consists in that the attributes are metadata defined according to the MPEG 7 standard.

The invention also relates to a viewing apparatus affording access to a set of audiovisual documents, comprising a display means for generating graphical pages to a display device, the graphical pages comprising at least two possibly unitary lists of elements of which one is a first list containing a graphically highlighted current element, a means of entering navigation commands, wherein it comprises a means of displacement moving at least one mobile graphical window containing the current element from the first list to at least one second list, the means of displacement being activated by a navigation command specifying a direction, the graphical window moving in the direction thus specified for a duration of the movement at least equal to the duration of the execution of the command.

BRIEF DESCRIPTION OF THE DRAWINGS

Other characteristics and advantages of the invention will now become apparent in greater detail within the framework of the following description of exemplary embodiments given by way of illustration while referring to the appended figures, which represent.

DETAILED DESCRIPTION

Figure 1:
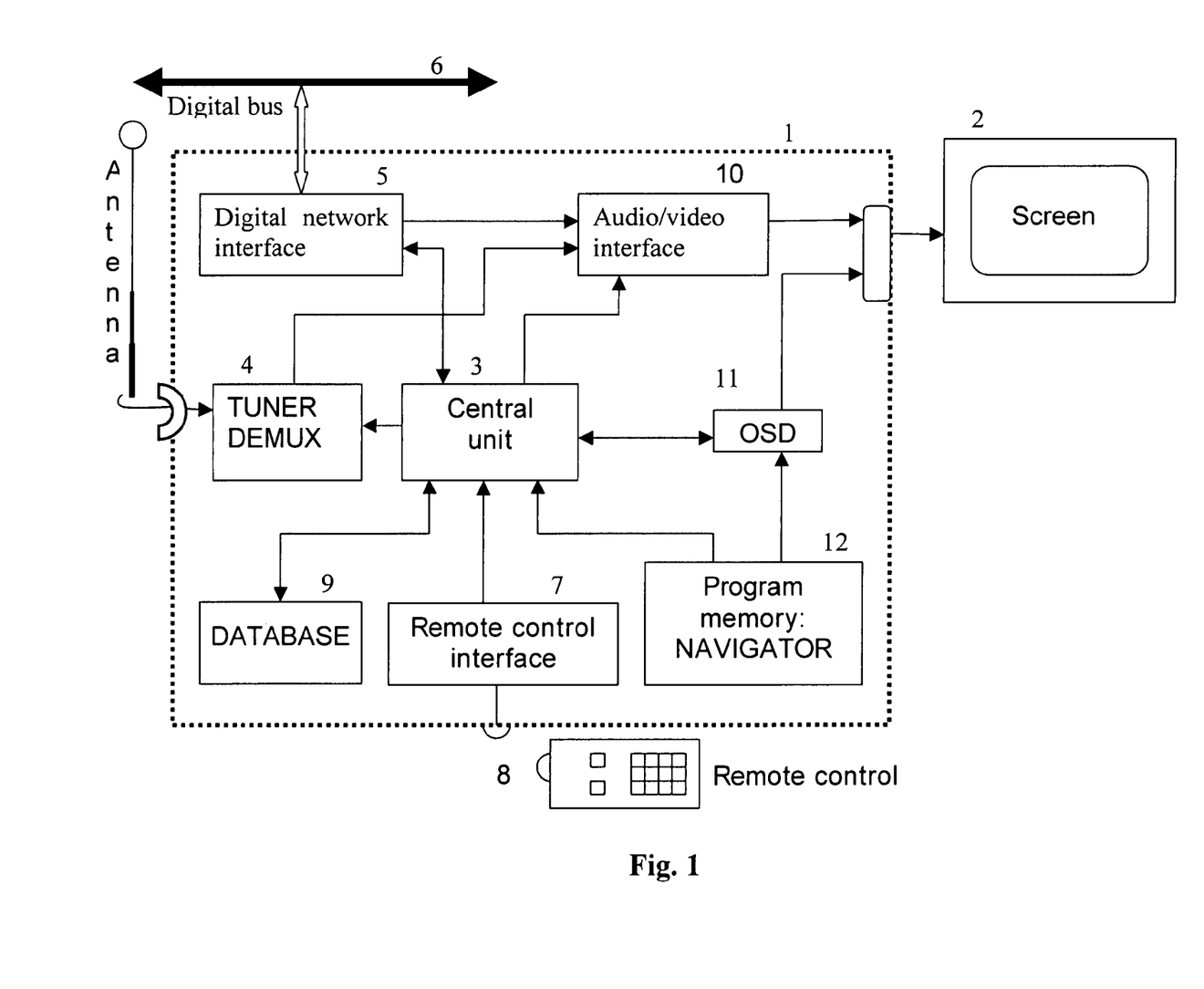
FIG. 1 is a block diagram of a viewing apparatus for the implementation of an exemplary embodiment of the invention.

The structure of a viewing apparatus 1 equipped with a display device 2 according to an exemplary embodiment of the invention is firstly described. A decoder is described here but other apparatuses are also conceivable and apply to the present invention, for example a personal computer or a PVR (for example the Thomson-DTH7000 model produced and marketed by the applicant) or any apparatus capable of accessing audiovisual contents and furnished with means for creating and displaying menus. The viewing apparatus comprises a central unit 3 linked to a program memory 12, and an interface 5 for communicating with a high bit rate digital bus 6 making it possible to transmit audio/video data in real time. This network is preferably public and allows access to remote servers, is usually the IP network. The apparatus can also receive audio/video data from a transmission network through a reception antenna associated with a demodulator 4. The apparatus furthermore comprises an infrared signals receiver 7 for receiving the signals from a remote control 8, a memory 9 for storing a database, and audio/video decoding logic 10 for generating the audiovisual signals sent to the television screen 2. The remote control is furnished with ↑, ↓, → and ← direction buttons and "OK" and "select" buttons, the function of which we shall see later.

The viewing apparatus also comprises a circuit 11 for displaying data on the screen, often called the OSD circuit, the initials standing for "On Screen Display". The OSD circuit 11 is a text and graphics generator which enables menus and pictograms (for example, a number corresponding to the station displayed) to be displayed on the screen and enables the navigation menus in accordance with the present invention to be displayed. The OSD circuit is controlled by the central unit 3 and a navigator 12. The navigator 12 is advantageously embodied in the form of a program module recorded in a read only memory. It may also be embodied in the form of a custom circuit of ASIC type, for example.

The digital bus 6 and/or the broadcasting network sends the apparatus data comprising multimedia documents and descriptive data pertaining to these documents. These data originate either from a broadcasting network, or from the digital network 6. The descriptive data comprise classification elements generally called "attributes" for the accessible multimedia documents. The descriptive data are for example metadata defined according to the MPEG 7 standard. These data are stored in the database of the memory 9 of the apparatus and are continuously updated. The navigator thereafter extracts the information from this database and processes it to produce the navigation menus displayed on the screen.

According to an exemplary embodiment the navigator takes into account five attributes: language, topic, sub-topic, source and producer. Each attribute constitutes an identifier of a list of elements making it possible to characterize the audiovisual content according to this attribute. Here are some examples of a list of elements set by the contents provider for classifying the available documents:

Language: English, French, German, Italian, Arabic, others;
Topic: film, information, documentary, sport, game/show;
Sub-topic:
  film: {adventure, drama, erotic, detective story, fiction, others};
  information: {news, radio, weather forecast, stock market, sport, other};
  documentary: {general, nature, culture, social, history};
  game/show: {general, variety, circus, talk show, circus};
  sport: {general, football, tennis, basketball, athletics, water sports};
Source: TPS, satellite channel, home DVD, video recorder, internet;
Producer: Spielberg, Coppola, Besson, Kubrick, Truffaud.

The viewing apparatus 1 also takes into account the title and the summary which are contained in identified fields of descriptive data. The title and the summary consist of character strings that can be processed digitally. For example, the title of the film "Les dents de la Mer" ["Jaws"] contains the significant words "dents" and "Mer". An improvement consists in the apparatus analysing the significance of the words so as to deduce elements of attributes therefrom and thereby to identify one or more subject matter(s) dealt with in the document. The apparatus filters the character strings, retaining only the significant words. The filtering is performed with the help of a list of words which possess a precise semantic content. If a word of the title or of the summary is present in the list, then it is retained, otherwise it is not taken into account. The apparatus associates a sixth attribute called "Title and summary" with the five previously cited in order to classify each document. According to the titles and contents of the summaries, the filtering makes it possible to extract words as a function of a list specific to the apparatus. It should be noted that such filtering may delete all the words, in this case this sixth attribute is not taken into account.

Finally, other attributes not listed above may be used.

The viewing apparatus processes all the attributes and formulates a screen page possessing several graphical lists. Each list contains elements associated with one and the same attribute or identifiers of documents and preferably each list corresponds to different attributes. Each element of a list is placed in a graphical window. At the start, an element is highlighted (it is also said to be "in focus"), this being the current element and in the current list. Two first commands triggering navigation displacements, for example the ↓ and ↑ direction arrow buttons for a list displayed vertically, enable the user to navigate around this list. Insofar as this navigation does not modify the focus, the display is instantaneous. With the help of two other commands, for example the ← and →, buttons, the user selects another graphical list whose elements correspond to an attribute other than that of the starting list. The navigator will then search for information and process it so as to present a new graphical content to the user. In the course of this processing time, the graphical window containing the current element moves in the direction indicated by the direction arrow and positions itself at the location of the graphical window that will then be in focus. On arrival, the graphical list will be updated with a new list of elements having at least one attribute in common, this new list being in focus.

The way in which to calculate the contents of graphical windows following the command activation by the user has already been described in patent applications filed in particular by the applicant, and therefore need not be explained further. These contents correspond to a list of elements that can be accessed directly from the node of a graph. The point to be grasped is that this calculation may last some time for various reasons. For example, the apparatus 1 is furnished with a memory of large capacity and records a great deal of information about the available documents in passing. Utilization of the data to provide the user with an optimum list of elements therefore requires a fairly long processing time. This processing time is lengthened when the apparatus uses a user profile to update its data. Another reason that lengthens the time to formulate a new screen shot is the fact that the data to be displayed are not yet available within the apparatus. For example, if the documents are provided by a transmission network, the associated information is broadcast in tables, the updating of which may last some time. The time is also lengthened if the apparatus has to lock onto a new frequency in order to recover the information.

For a better understanding of the way in which the invention operates, we shall now take a few examples of commands as illustrated by FIG. 2.

Figure 2A:
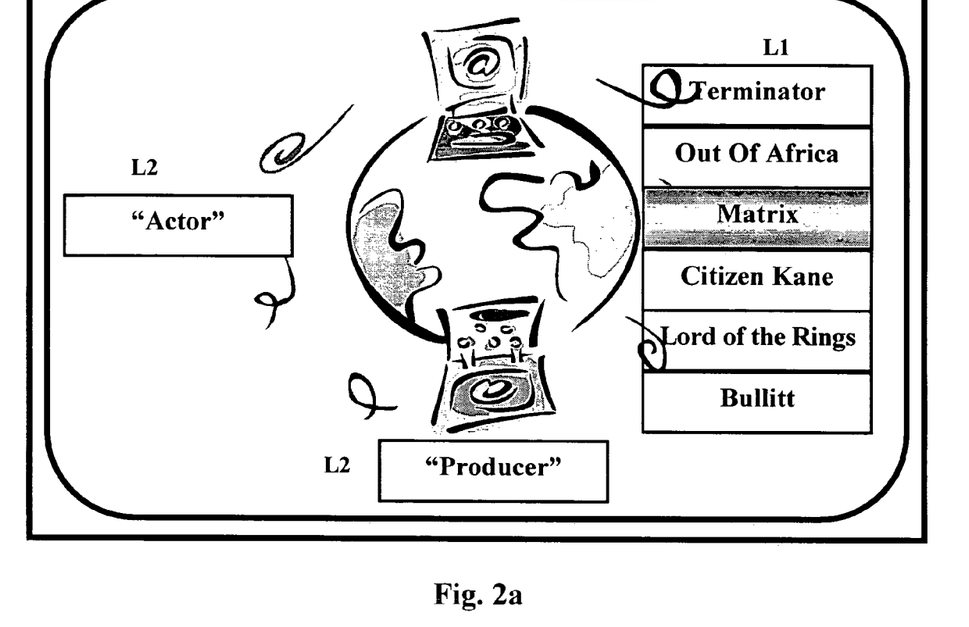
FIGS. 2a, 2b, 2c and 2d are examples of screen shots generated by the navigator.
Figure 2B:
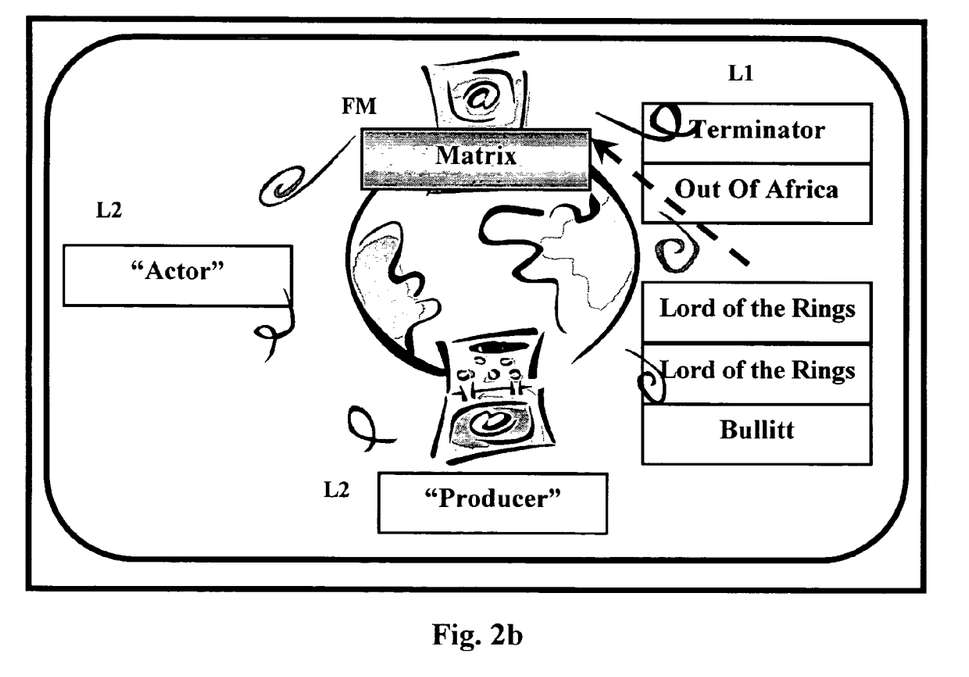
Figure 2C:
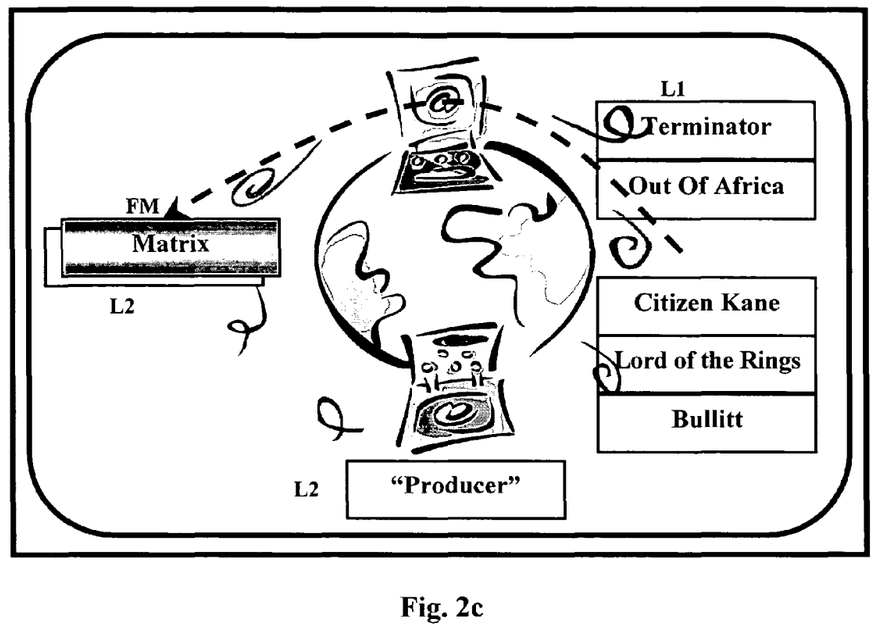
Figure 2D:
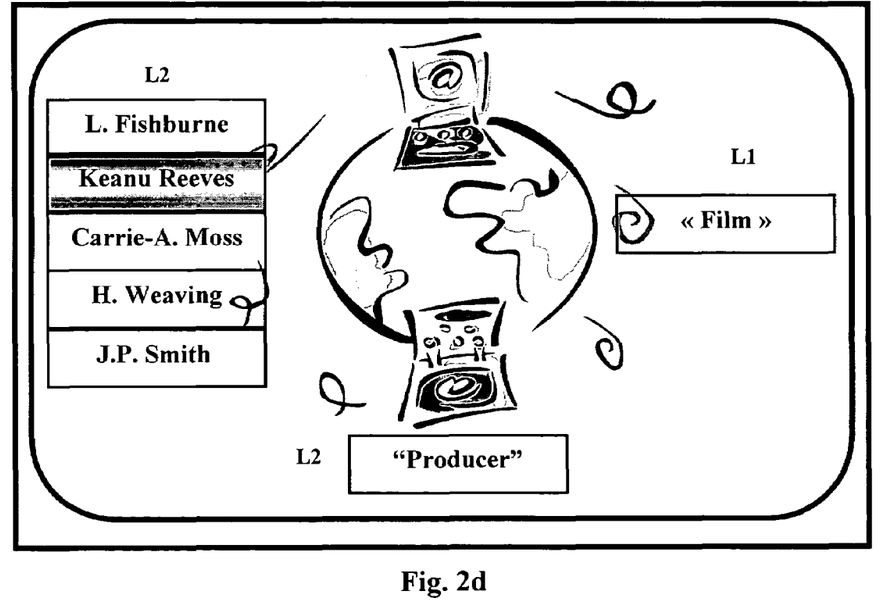

A user is watching the film called "Matrix" transmitted on a station. He then launches the navigator by pressing a button on his remote control. The navigator takes command of the OSD circuit 11 and brings up the three graphical lists, the display of the film appearing as a screen background such as is represented in FIG. 2.a. The list on the right, called L1, contains titles of films, one of which is in focus ("Matrix") that on the left L2 contains an attribute identifier ("Actor") and that at the bottom of the screen L2 contains another one ("Producer"). According to the preferred exemplary embodiment of the invention, the user navigates from a starting list L1 to an arrival list L2 using means for entering a direction, for example the direction buttons of a remote control.

In the example displayed in FIG. 2.a, a variant consists in the left-hand list displaying the names of actors and the right-hand list displaying names of producers, the user being well aware of the attribute associated with the lists. The user can thus find out other names while knowing that the left-hand and bottom lists correspond to actors and producers. In this way, if the user wants to navigate among the names of actors he presses the "left" button (←) of his remote control, hence towards the list situated on the left of the list that is in focus. The navigator then calculates the time required to recover this information and causes the movement of the mobile graphical window FM containing "Matrix" towards the graphical list containing "Actor" (or containing names of actors). FIG. 2.b shows the movement of the mobile window FM around half-way through. The window moves for at least the time necessary to recover or process the information with a view to display. The mobile graphical window FM approaches the list L2 containing "Actor" (FIG. 2.c) and when it occupies the same position the information is ready to be displayed. The graphical list on the left L2 gets larger so as to contain the list of the five main actors in the film "Matrix" ("Keanu Reeves, L. Fishburne, Carrie-A Moss, H. Weaving, J. P. Smith"), the first being highlighted. A new graphical window appears in place of that containing "Matrix" before the movement, it contains the attribute "Film". The screen shot is then that shown in FIG. 2.d. The user can now navigate within a new starting list L1, which contains names of actors, with the help of the ↓ and ↑ direction arrow buttons. By pressing the → right arrow button, which indicates the direction of the "Film" graphical list, he asks the navigator for a list of films in which the actor currently highlighted (Keanu Reeves) has a part. Following the activation of this button the box containing "Keanu Reeves" exits the graphical list of actors and moves towards the list L2 of the film titles. During this time, the navigator searches among the available documents for those having "Keanu Reeves" as actor by analysing the associated metadata. A way of approximately calculating the processing time for such a request is to multiply a mean processing time for a document by the total number of documents available. At the end of the movement, the arrival graphical list is updated immediately. In the example, when the window containing "Keanu Reeves" reaches the list of films, the graphical list "Matrix 1, Matrix Reloaded, Speed, Johnny Mnemonic, etc." appears in the list occupied previously by "film". The user can navigate within the list of films with the help of the ↓ and ↑ direction arrow buttons, this movement causing no modification of the listed elements. If the user now wants to change producers, he presses the → button then immediately afterwards the ↓ button, the effect of this being to indicate the downward right direction towards the graphical window indicating to "Producer". The navigator then determines a list of names of film producers currently available from the viewing apparatus, he moves the window that is in focus towards the right and downwards and displays the list of producers he has just determined.

Figure 3:
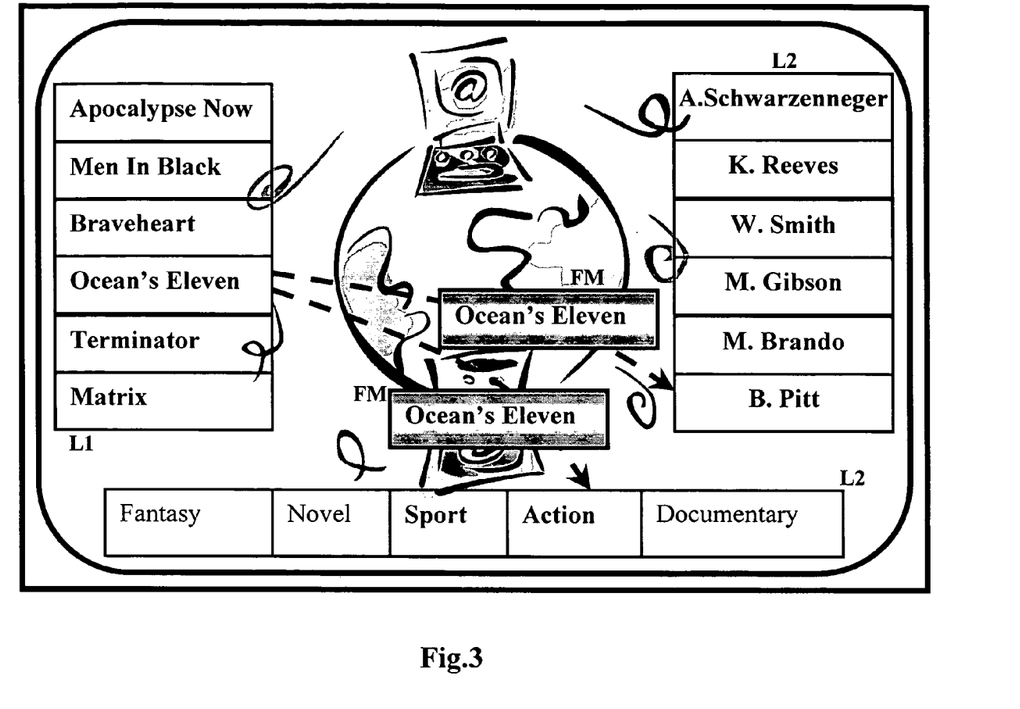
FIG. 3 is an example of a screen shot generated by the navigator, according to an improvement of the invention.

An improvement represented in FIG. 3 consists in the mobile window FM being split at the start of the movement, each of the two windows FM being directed towards another list corresponding to a determined attribute. The direction of navigation is approximately the general direction of the movements of the mobile graphical windows. When one of the windows FM reaches the corresponding arrival list, the latter is updated with the content corresponding to the command. According to the times calculated by the navigator to update the two contents, the movements of the two windows FM occur for a different duration. This improvement makes it possible to indicate to the user that the two arrival lists L2 will be updated at the end of the movements.

According to a preferred embodiment, the window FM moves leaving a void in the starting list. An improvement consists in moving a copy of the window FM in certain cases, there is then no void in the starting list L1. This characteristic indicates to the user that the starting list L1 will not be changed on completion of the movement, since it remains intact. On the other hand, if the window FM moves leaving a gap in the starting list L1, then this list will be modified or will disappear from the new graphical page.

We shall now describe how the navigator operates. The main steps executed by the navigator are described by the flowchart of FIG. 4. When launched (step 4.1), the navigator analyses the database and determines a current element, which is for example the event currently being viewed. The navigator then formulates a graphical page containing a menu displaying several lists of attribute elements, one of these lists contains the current element.

Figure 4:
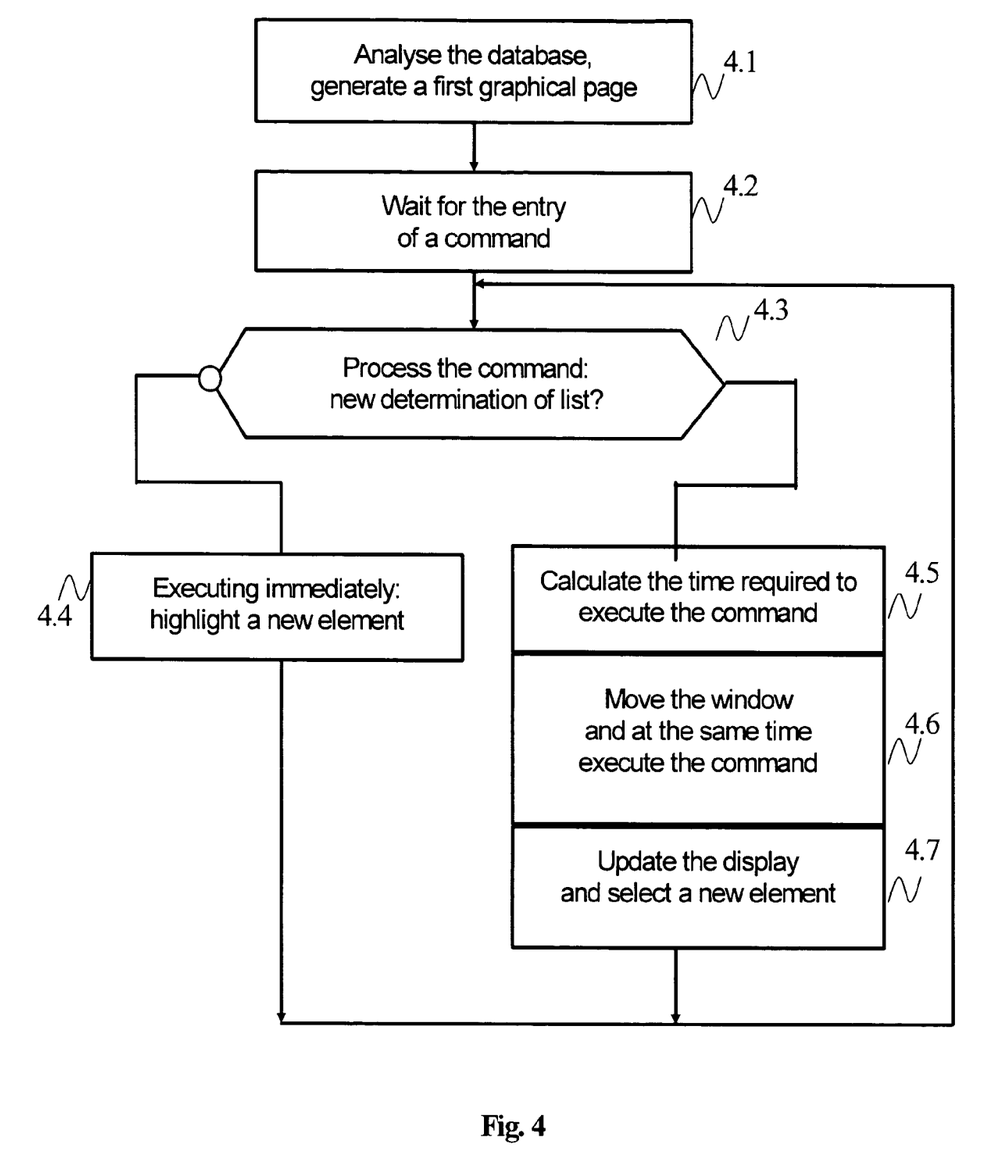
FIG. 4 is a flowchart of the main steps performed by the navigator.

In step 4.2, the user enters a navigation command. To do this, the user can use the direction buttons of his remote control or, if the apparatus is furnished with voice recognition, speak into it words such as "left", "right", "up", "down", and so on. The navigator then processes the command received (step 4.3) and determines whether this command requires a movement of the focus highlighting an element, or whether the command requires a complete recalculation of at least one list displayed. If the command consists in moving the focus without modifying the elements displayed, then it executes immediately (step 4.4). The element placed on the screen in the direction indicated by the command is then highlighted, and the program returns to step 4.2 awaiting the entry of a command from the user. In the converse case, the navigator determines the time required to formulate a new graphical content as a function of the command entered (step 4.5). A simple procedure consists in deploying a table which associates a command entered with a maximum execution time. For example, the search for a list of values of metadata associated with a node of the graph will be very fast since this type of information is immediately available. On the other hand, the list of films having a certain value of metadata (the name of an actor, for example) requires a search through the database of audiovisual documents and hence more calculation time. An improvement consists in this time being calculated as a function of the total number of elements displayed in the arrival list or in the lists updated by the command. This improvement is particularly useful when the user can customize the display, for example by indicating the number of elements per list. The production of a graphical page comprising 15 elements (3 lists of 5 elements) takes twice as long than if it comprises 30 elements (3 lists of 10 elements). Therefore, the calculation of the production time for the graphical page involves multiplying a maximum time for determining an element by the number of elements. If the navigator analyses a database to formulate the page, the calculation time is approximately obtained by multiplying the mean processing time for a document by the total number of documents available in the database. It is possible to calculate in other ways, each of these ways can be combined with others.

In step 4.6, the graphical window of the current elements moves in a certain direction, at the same time the viewing apparatus processes the command entered. This direction corresponds to the command entered: if it is "right" then the window moves to the right of the screen and corresponds to the position of the new current element. In this way the user sees that the processing is indeed that corresponding to the navigation command entered and is informed that the new element which will be displayed at the end of the movement will be in the list situated in the direction of the movement.

At the end of the movement, which corresponds to the time calculated in step 4.5, the graphical page is immediately updated with at least one new list of elements (step 4.7). The new current element is located in the list reached by the mobile window at the end of the movement. The program then returns to step 4.2 awaiting the entry of a command from the user.

In addition to the direction commands allowing navigation, the user can select the current element by pressing the "OK" button. For example, if "Matrix" is in focus, the user can view this film by pressing this button.

Although the present invention has been described with reference to the particular embodiments illustrated, it is in no way limited by these embodiments, but is so only by the appended claims. It will be noted that changes or modifications may be made to the embodiments described above by the person skilled in the art without thereby departing from the scope of the present invention.

The invention claimed is:

1. Process for navigating among a list of elements displayed by a viewing apparatus, comprising the steps of:
generating a graphical page which is capable of being displayed on a viewing apparatus, the graphical page comprising at least two lists of elements associated with multimedia documents where each of said lists comprises at least one element, and wherein each list of said at least two lists are separate from one another;
triggering calculation of at least one new element which is displayed in a first list of said at least two lists in response to entry of a command from a user specifying a direction indicative of the direction to the first list from a second list of said at least two lists;
moving automatically at least one mobile graphical window of a current element from the second list to the first list in the direction specified wherein the duration of the movement of the at least one mobile graphical window from the second list to the first list is at least equal to the duration of the execution of the calculating of the at least one new element which is displayed in the first list; and
displaying the at least one new element in the first list; and wherein the second list contains attribute values associated with the nodes of a navigational graph and possesses a current value of attribute, the first list displaying, before or after the movement, elements in relation to the current value of attribute.

2. Navigation process according to claim 1, wherein it comprises a step of displaying new elements of the second list at the end of the movement of the at least one mobile graphical window.

3. Navigation process according to claim 1, wherein the duration of movement depends also on the number of new elements displayed in the first list.

4. Navigation process according to claim 1, wherein a copy of the mobile graphical window remains in the second list, the content of the second list not being modified at the end of the movement.

5. Navigation process according to claim 1, wherein the mobile graphical window of the current element exits the second list, the content of the second list being modified at the end of the movement.

6. Navigation process according to claim 1, wherein the at least one graphical window associated with the current element is divided into a plurality of mobile graphical windows moving towards the first list and a third list, the new elements of the first list and the third list being displayed when the corresponding graphical mobile window reaches the first list and the third list, respectively, the duration of the movement of the corresponding mobile graphical window from the second list to each of the first and the third list, respectively, being at least equal to the duration of the execution of the command applied to each of the corresponding graphical mobile windows and the first list and the third list, respectively.

7. Navigation process according to claim 1, wherein the attributes are metadata defined according to the MPEG 7 standard.

8. Viewing apparatus affording access to a set of multimedia documents comprising
- a display means for generating a graphical page, the graphical page comprising at least two lists of elements where each list comprises at least one element, wherein each list of said at least two lists are separate from one another and one of said at least two lists is a first list with a graphically highlighted current element,
- a means for entering navigation commands, wherein said means for entering navigation commands comprises a means of displacement for initiating the movement of at least one mobile graphical window containing the current element from the first list to a second list of said at least two lists, where a navigation command from a user specifying a direction indicative of the direction from the first list to the second list activates the means of displacement; and
- a means for calculation of at least one new element displayed in the second list, the graphical window automatically moving in the direction specified where the duration of the movement from said first list to said second list is at least equal to the duration of the execution of the calculation of at least one new element displayed in the second list wherein the first list generated by the means of display contains attribute values associated with nodes of a navigation graph and possesses a current value of attribute and in that the second list generated by the display means displays, before or after the movement, elements in relation to the current value of attribute.

9. Viewing apparatus according to claim 8, additionally comprises a means for determining new elements of the second list at the end of the movement of the mobile graphical window, these new elements being displayed at the end of the movement.

10. Viewing apparatus according to claim 8, additionally comprises a means for calculation for determining the duration of movement also as a function of the number of new elements displayed in the second list.

11. Viewing apparatus according to claim 8, wherein the means for display generates graphical pages comprising several second lists, the means of displacement generates mobile graphical windows moving towards each of the second lists and calculates the duration of each movement so that it is at least equal to the duration of the execution of the command applied to each of the graphical windows.

12. Navigating process according to claim 1, wherein said at least two lists includes a third list, said first, second and third lists being separate from one another, said process further comprising the steps of:
- triggering calculation of at least one new element which is displayed in the third list in response to entry of a command from a user specifying a direction indicative of the direction to the second list from the third list; and
- moving automatically at least one mobile graphical window of a current element from the second list to the third list in the direction specified wherein the duration of the movement of the at least one mobile graphical window from the second list to the third list is at least equal to the duration of the execution of the calculating of the at least one new element which is displayed in the third list.

* * * * *

UNITED STATES PATENT AND TRADEMARK OFFICE
CERTIFICATE OF CORRECTION

PATENT NO. : 7,574,668 B2 Page 1 of 1
APPLICATION NO. : 10/973907
DATED : August 11, 2009
INVENTOR(S) : Nunez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this

Seventh Day of September, 2010

David J. Kappos
*Director of the United States Patent and Trademark Office*